United States Patent
Uchimura (10) Patent No.: US 10,385,207 B2
(45) Date of Patent: Aug. 20, 2019

(54) POLYCARBONATE RESIN COMPOSITION AND METHOD FOR PRODUCING SAME

(71) Applicant: Mitsubishi Engineering-Plastics Corporation, Minato-ku (JP)

(72) Inventor: Ryuuji Uchimura, Hiratsuka (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 22 days.

(21) Appl. No.: 15/580,400

(22) PCT Filed: Sep. 20, 2016

(86) PCT No.: PCT/JP2016/077679
§ 371 (c)(1),
(2) Date: Dec. 7, 2017

(87) PCT Pub. No.: WO2017/057092
PCT Pub. Date: Apr. 6, 2017

(65) Prior Publication Data
US 2018/0187002 A1   Jul. 5, 2018

(30) Foreign Application Priority Data

| | | |
|---|---|---|
| Oct. 2, 2015 | (JP) | 2015-196835 |
| Oct. 16, 2015 | (JP) | 2015-204209 |
| Jul. 25, 2016 | (JP) | 2016-145675 |
| Jul. 25, 2016 | (JP) | 2016-145676 |

(51) Int. Cl.
*C08L 69/00* (2006.01)
*C08J 3/00* (2006.01)

(52) U.S. Cl.
CPC ............ *C08L 69/00* (2013.01); *C08J 3/005* (2013.01); *C08J 2369/00* (2013.01); *C08J 2455/02* (2013.01); *C08L 2201/08* (2013.01)

(58) Field of Classification Search
USPC .......................................................... 525/68
See application file for complete search history.

(56) References Cited

U.S. PATENT DOCUMENTS

| | | |
|---|---|---|
| 6,133,379 A | 10/2000 | Yamagishi |
| 2002/0060378 A1 | 5/2002 | Miyamoto et al. |
| 2010/0210789 A1 | 8/2010 | Seidel et al. |

FOREIGN PATENT DOCUMENTS

| | | |
|---|---|---|
| JP | 10-292053 A | 11/1998 |
| JP | 2001-064502 A | 3/2001 |
| JP | 2002-154114 A | 5/2002 |
| JP | 2003-511506 A | 3/2003 |
| JP | 2006-182841 A | 7/2006 |
| JP | 2012-518063 A | 8/2012 |
| WO | 2001/025333 A1 | 4/2001 |

OTHER PUBLICATIONS

International Search Report dated Oct. 18, 2016 in PCT/JP2016/077679, filed on Sep. 20, 2016.

*Primary Examiner* — Terressa Boykin
(74) *Attorney, Agent, or Firm* — Oblon, McClelland, Maier & Neustadt, L.L.P.

(57) ABSTRACT

Provided are: a polycarbonate resin composition which has excellent mechanical properties and wet heat resistance while being free from the problem of mold contamination due to mold deposits; and a production method which is capable of producing this polycarbonate resin composition with high productivity. A polycarbonate resin composition containing 60% to 95% by mass of a polycarbonate resin (A) and 40% to 5% by mass of an emulsion polymerized styrene-based resin (B), based on 100% by mass of a total of (A) and (B), wherein the emulsion polymerized styrene-based resin (B) is a graft copolymer of a styrenic monomer-vinyl cyanide monomer and/or an alkyl (meth)acrylate monomer-rubbery polymer; and a total amount of gas in a case where the resin composition is heated at 280° C. for 10 minutes is 3000 ppm or less in terms of mass of decane.

12 Claims, 2 Drawing Sheets

POLYCARBONATE RESIN COMPOSITION AND METHOD FOR PRODUCING SAME

TECHNICAL FIELD

The present invention relates to a polycarbonate resin composition and a method for producing same, and more specifically relates to a polycarbonate resin composition which has excellent mechanical properties and wet heat resistance while being free from the problem of mold contamination due to mold deposits; and a method for producing this polycarbonate resin composition with high productivity.

BACKGROUND ART

Polycarbonate resins are resins that exhibit excellent heat resistance, mechanical properties and electrical properties, and are widely used in, for instance, automotive materials, electrical and electronic device materials, housing materials and materials for producing components in other industries. In addition, polymer alloys with other thermoplastic resins have been developed, and of these, polymer alloys with styrene-based resins such as ABS resins are less expensive and enable better molding processing properties and impact resistance than polycarbonate resins, and are widely used as parts of electrical and electronic devices and OA information devices, such as computers, personal computers, portable terminals, printers and copying machines.

ABS resins used in polycarbonate/styrene-based resin compositions are often produced by means of emulsion polymerization for reasons such as cost, applicability to a wide range of products and facilitating quality improvement by increasing rubber content, but bulk polymerized ABS resins are used for reasons such as wet heat resistance, as disclosed in PTL 1 (see claim 8; paragraph [0024]).

Styrene-based resins by bulk polymerization are expensive, and use of products obtained by means of emulsion polymerization has been considered in order to reduce costs, but polycarbonate resin compositions containing emulsion polymerized styrene-based resins have the drawback of wet heat resistance being poor. Furthermore, problems occur, such as mold contamination due to mold deposits during molding being significant, and the amount of gas generated being large.

It is thought that these problems are caused by components derived from emulsifiers used during emulsion polymerization or oligomer components remaining in styrene-based resins, and although the mechanisms thereof are not sufficiently clear, it is thought that components derived from emulsifiers affect hydrolysis of polycarbonate resins and cause a deterioration in wet heat resistance, and that oligomer components cause mold contamination and gas generation.

Emulsion polymerized ABS resins are generally produced by emulsion polymerizing a butadiene using mainly a higher fatty acid soap or rosin acid soap as an emulsifier and using a water soluble polymerization initiator so as to obtain a polymer latex and then polymerizing styrene and acrylonitrile or the like in the presence of the polymer particles and an emulsifier so as to obtain an ABS polymer latex, and then adding a coagulating agent such as an inorganic acid or a divalent metal salt to the ABS polymer latex, washing and drying. For reasons of economy, the emulsifier is not completely removed in the washing step, and unremoved emulsifier remains in the product.

Consideration has been given to thoroughly pre-washing ABS resin raw materials used in emulsion polymerization, but it was found that even if thorough washing is carried out using water or an organic solvent such as methanol, emulsifier components contained in the resin cannot be easily removed.

CITATION LIST

Patent Literature

[PTL 1] Japanese Patent Application Publication No. 2001-64502

SUMMARY OF INVENTION

Technical Problem

The purpose (problem) of the present invention is to provide a polycarbonate resin composition which contains an emulsion polymerized styrene-based resin and which can solve problems relating to wet heat resistance and mold deposits; and a method for producing the polycarbonate resin composition with high productivity.

Solution to Problem

As a result of diligent research into how to solve the problems mentioned above, the inventor of the present invention found that a polycarbonate/styrene-based resin composition which contains specific quantities of a polycarbonate resin and a specific emulsion polymerized styrene-based resin and by which the total amount of gas in cases where the resin composition is heated at 280° C. for 10 minutes is 3000 ppm or less in terms of mass of decane exhibits excellent mechanical properties and wet heat resistance while being free from the problem of mold contamination due to mold deposits.

In addition, when the polycarbonate resin composition is produced by melt kneading the emulsion polymerized styrene-based resin and the polycarbonate resin, the inventor of the present invention found that the problems mentioned above could be solved by first introducing the emulsion polymerized styrene-based resin, which is an added component and is a component used at a smaller quantity than the polycarbonate resin, from the base of an extruder, venting under reduced pressure so as to evaporate off gas generating components derived from the emulsifier, supplying the polycarbonate resin, which is the main component, from a raw material supply port located downstream of the vent and then melt kneading, and also found that by injecting water when melt kneading the styrene-based resin, the problems mentioned above could be solved and the resin composition could be produced with high productivity, and thereby completed the present invention.

The present invention is the polycarbonate resin composition described below, a molded article thereof, and the method for producing a polycarbonate resin composition described below.

[1] A polycarbonate resin composition containing 60% to 95% by mass of a polycarbonate resin (A) and 40% to 5% by mass of an emulsion polymerized styrene-based resin (B), based on 100% by mass of the total of (A) and (B), wherein the emulsion polymerized styrene-based resin (B) is a graft copolymer of a styrenic monomer-vinyl cyanide monomer and/or an alkyl (meth)acrylate monomer-rubbery polymer; and a total amount of gas in a case where the resin composition is heated at 280° C. for 10 minutes is 3000 ppm or less in terms of mass of decane.

[2] The polycarbonate resin composition according to [1] above, wherein the styrene-based resin (B) is dispersed in the form of islands in a matrix of the polycarbonate resin (A), a volume average particle diameter (dv) of the styrene-based resin (B) is 2.5 μm or less, and a ratio (dv/dn) of the volume average particle diameter (dv) to a number average particle diameter (dn) of the styrene-based resin (B) is within the range 1.0 to 1.5.

[3] The polycarbonate resin composition according to [1] or [2] above, wherein an impact strength retention rate is 50% or more after being subjected to a wet heat treatment for 400 hours in an environment having a temperature of 90° C. and a relative humidity of 95%.

[4] A polycarbonate resin composition containing 60% to 95% by mass of a polycarbonate resin (A), 40% to 5% by mass of an emulsion polymerized styrene-based resin (B) and 0% to 30% by mass of a styrene-based resin (C) other than the emulsion polymerized styrene-based resin, based on 100% by mass of the total of (A) to (C), wherein the emulsion polymerized styrene-based resin (B) is a graft copolymer is of a styrenic monomer-vinyl cyanide monomer and/or an alkyl (meth)acrylate monomer-rubbery polymer; and a total amount of gas in a case where the resin composition is heated at 280° C. for 10 minutes is 3000 ppm or less in terms of mass of decane.

[5] The polycarbonate resin composition according to [4] above, wherein the other styrene-based resin (C) is a suspension polymerized or bulk polymerized styrene-based resin.

[6] The polycarbonate resin composition according to [4] or [5] above, wherein the other styrene-based resin (C) is a suspension polymerized AS resin.

[7] The polycarbonate resin composition according to any one of [4] to [6] above, wherein the other styrene-based resin (C) is a bulk polymerized ABS resin.

[8] The polycarbonate resin composition according to any one of [1] to [7] above, wherein the emulsion polymerized styrene-based resin (B) is dispersed in the form of islands in a matrix of the polycarbonate resin (A), the volume average particle diameter (dv) of the emulsion polymerized styrene-based resin (B) is 2.5 μm or less, and the ratio (dv/dn) of the volume average particle diameter (dv) to the number average particle diameter (dn) of the emulsion polymerized styrene-based resin (B) is within the range 1.0 to 1.5.

[9] The polycarbonate resin composition according to any one of [1] to [8] above, wherein the impact strength retention rate is 50% or more after being subjected to a wet heat treatment for 400 hours in an environment having a temperature of 90° C. and a relative humidity of 95%.

[10] A molded article of the polycarbonate resin composition according to any one of [1] to [9] above.

[11] A method for producing a polycarbonate resin composition by melt kneading, in a vented twin screw extruder, a polycarbonate resin composition containing 60% to 95% by mass of a polycarbonate resin (A) and 40% to 5% by mass of an emulsion polymerized styrene-based resin (B), based on 100% by mass of the total of (A) and (B), the extruder having a first raw material supply port on an upstream side and one or more second raw material supply ports on a downstream side thereof, the method including:

when supply quantity of the emulsion polymerized styrene-based resin (B) is denoted by B(1), supply quantity of the polycarbonate resin (A) supplied from the first raw material supply port is denoted by A(1) and supply quantity of the polycarbonate resin (A) supplied from the second raw material supply port is denoted by A(2), a sum of A(1) and A(2) is a total supply quantity of the polycarbonate resin (A), the method including:

supplying the styrene-based resin (B) and the polycarbonate resin (A) from the first raw material supply port so as to satisfy the following formula:

$$B(1)>A(1) \text{ where, } A(1) \text{ includes } 0;$$

degassing gas components under reduced pressure from a vent port following the melt kneading; and then supplying the polycarbonate resin (A) in the quantity A(2) from the second raw material supply port, which is located further downstream than the vent port.

[12]

The method for producing a polycarbonate resin composition according to [11] above, wherein the gas components include gas components derived from an emulsifier.

[13]

A method for producing a polycarbonate resin composition by melt kneading, in a vented twin screw extruder, a polycarbonate resin composition containing 60% to 95% by mass of a polycarbonate resin (A) and 40% to 5% by mass of an emulsion polymerized styrene-based resin (B), based on 100% by mass of a total of (A) and (B), the extruder having a first raw material supply port on an upstream side, a water injection section and a vent port in a mixing section that is downstream of the first raw material supply port, and one or more second raw material supply ports downstream of the mixing section, the method including:

when the supply quantity of the emulsion polymerized styrene-based resin (B) is denoted by B(1), supply quantity of the polycarbonate resin (A) supplied from the first raw material supply port is denoted by A(1) and supply quantity of the polycarbonate resin (A) supplied from the second raw material supply port is denoted by A(2), a sum of A(1) and A(2) is a total supply quantity of the polycarbonate resin (A), supplying the styrene-based resin (B) and the polycarbonate resin (A) from the first raw material supply port so as to satisfy the following formula:

$$B(1)>A(1) \text{ where, } A(1) \text{ includes } 0;$$

injecting water from a water injection section provided in the mixing section, carrying out melt kneading, and then degassing gas components under reduced pressure from the vent port; and then supplying the polycarbonate resin (A) in the quantity A(2) from the second raw material supply port, which is located downstream of the vent port.

[14]

The method for producing a polycarbonate resin composition according to [13] above, wherein the gas components include gas components derived from an emulsifier.

[15]

The polycarbonate resin composition production method according to [13] or [14] above, wherein the vented twin screw extruder is an extruder having a water injection section and a vent port in multiple stages and water injection and degassing under reduced pressure are carried out in multiple stages.

[16]

A molded article obtained by molding a polycarbonate resin composition obtained using a production method of [11] to [15] above.

Advantageous Effects of Invention

The polycarbonate resin composition of the present invention exhibits excellent mechanical properties and wet heat resistance while being free from the problem of mold contamination due to mold deposits. In addition, the method for producing a polycarbonate resin composition of the present invention enables a polycarbonate resin composition, which exhibits excellent mechanical properties and wet heat resistance while being free from the problem of mold contamination due to mold deposits, to be produced with high productivity.

DESCRIPTION OF EMBODIMENTS

The present invention will now be explained in greater detail through the use of embodiments and illustrations, but it should be understood that the present invention is not limited to the embodiments and illustrations given below.

Moreover, in the description of the present application, the symbol "-" means that the upper and lower limits of the numerical values mentioned before and after the symbol are included, unless explicitly stated otherwise. In addition, "ppm" means ppm in terms of mass unless explicitly stated otherwise.

The polycarbonate resin composition of the present invention is a resin composition containing 60% to 95% by mass of a polycarbonate resin (A) and 40% to 5% by mass of an emulsion polymerized styrene-based resin (B), based on 100% by mass of a total of (A) and (B), wherein the emulsion polymerized styrene-based resin (B) is a graft copolymer of a styrenic monomer-vinyl cyanide monomer and/or an alkyl (meth)acrylate monomer-rubbery polymer; and a total amount of gas in a case where the resin composition is heated at 280° C. for 10 minutes is 3000 ppm or less in terms of mass of decane.

The method for producing a polycarbonate resin composition of the present invention includes melt kneading, in a vented twin screw extruder, a polycarbonate resin composition containing 60% to 95% by mass of a polycarbonate resin (A) and 40% to 5% by mass of an emulsion polymerized styrene-based resin (B), based on 100% by mass of the total of (A) and (B), the extruder having a first raw material supply port on the upstream side and one or more second raw material supply ports on the downstream side thereof, the method including:

when supply quantity of the emulsion polymerized styrene-based resin (B) is denoted by B(1), supply quantity of the polycarbonate resin (A) supplied from the first raw material supply port is denoted by A(1) and supply quantity of the polycarbonate resin (A) supplied from the second raw material supply port is denoted by A(2), a sum of A(1) and A(2) is a total supply quantity of the polycarbonate resin (A), the method including:

supplying the styrene-based resin (B) and the polycarbonate resin (A) from the first raw material supply port so as to satisfy the following formula:

$$B(1) > A(1) \text{ where, } A(1) \text{ includes } 0;$$

degassing gas components under reduced pressure from a vent port following the melt kneading; and then supplying the quantity A(2) of the polycarbonate resin (A) from the second raw material supply port, which is located downstream of the vent port.

Furthermore, it is preferable to carry out water injection in the production method of the present invention.

[Polycarbonate Resin (A)]

Examples of the polycarbonate resin (A) used in the present invention include aromatic polycarbonate resins, aliphatic polycarbonate resins and aromatic-aliphatic polycarbonate resins, but aromatic polycarbonate resins are preferred, and more specifically, a thermoplastic aromatic polycarbonate polymer or copolymer obtained by reacting an aromatic dihydroxy compound with phosgene or a carbonic acid diester can be used.

Examples of the aromatic dihydroxy compound include 2,2-bis(4-hydroxyphenyl)propane (that is, bisphenol A), tetramethylbisphenol A, α,α'-bis(4-hydroxyphenyl)-p-diisopropylbenzene, hydroquinone, resorcinol and 4,4'-dihydroxydiphenyl. In addition, compounds obtained by bonding one or more tetraalkyl phosphonium sulfonates to the aromatic dihydroxy compounds mentioned above, polymers having a siloxane structure and containing a phenolic hydroxyl group at both terminals and oligomers thereof can be used in order to improve flame retardancy.

Preferred examples of the polycarbonate resin (A) include polycarbonate resins in which 2,2-bis(4-hydroxyphenyl)propane—bisphenol A—or a combination of bisphenol A and another aromatic dihydroxy compound is used as the dihydroxy compound.

The polycarbonate resin may be a homopolymer of one type of repeating unit or a copolymer having two or more types of repeating unit. Here, copolymers may be selected from among a variety of copolymer forms, such as random copolymers and block copolymers.

The molecular weight of the polycarbonate resin (A) is not limited, but the viscosity average molecular weight (Mv) thereof is preferably 10,000 to 40,000, and more preferably 14,000 to 32,000. If the viscosity average molecular weight is within this range, moldability of an obtained resin composition is good and a molded article having high mechanical strength can be easily obtained. It is most preferable for the viscosity average molecular weight of the polycarbonate resin (A) to fall within the range 16,000 to 30,000.

In the present invention, the viscosity average molecular weight (Mv) of the polycarbonate resin (A) is of value that is obtained by determining the intrinsic viscosity ([η]) by measuring the viscosity of a methylene chloride solution of the polycarbonate resin at 20° C. using a Ubbelohde type viscometer, and then calculating the viscosity average molecular weight from the Schnell viscosity equation below.

$$[\eta]=1.23\times10^{-4}Mv^{0.83}$$

The method for producing the polycarbonate resin (A) is not particularly limited, and it is possible to use a polycarbonate resin produced using the phosgene method (an interfacial polymerization method) or a melt process (a transesterification method). In addition, a polycarbonate resin obtained by subjecting a polycarbonate resin produced by a melt process to a post treatment that adjusts the amount of terminal hydroxyl groups is also preferred.

In addition, the polycarbonate resin (A) may contain a polycarbonate oligomer. The viscosity average molecular weight [Mv] of this polycarbonate oligomer is generally 1,500 or higher, and preferably 2,000 or higher, and is generally 9,500 or lower, and preferably 9,000 or lower. Furthermore, it is preferable for the contained polycarbonate oligomer to account for 30% by mass or less of the polycarbonate resin (including the polycarbonate oligomer).

In addition, the polycarbonate resin (A) may use not only virgin raw materials, but also aromatic polycarbonate resins regenerated from used products (so-called material-recycled aromatic polycarbonate resins). Preferred examples of used products include optical recording media such as optical discs, light guide plates, motor vehicle windows and headlamp lenses, transparent motor vehicle components such as windshields, containers such as water bottles, spectacle lenses, noise barriers, windows, and construction materials such as corrugated sheets. In addition, recycled polycarbonate resins can be pulverized products obtained from defective articles, sprues and runners of products, or pellets obtained by melting these pulverized products.

[Emulsion Polymerized Styrene-Based Resin (B)]

The emulsion polymerized styrene-based resin (B) used in the present invention is an emulsion polymerized product produced by emulsion polymerization using an emulsifier.

The content of the emulsion polymerized styrene-based resin (B) is 40% to 5% by mass relative to a total of 100% by mass of (A) and (B), with the polycarbonate resin (A) being the main component contained at a quantity of 60% to 95% by mass. If the quantity of the styrene-based resin (B) is less than 5% by mass, fluidity during molding is insufficient and molding processing properties tend to deteriorate. If the content of the styrene-based resin (B) exceeds 40% by mass, mechanical strength and heat resistance deteriorate. The quantity of the styrene-based resin (B) is preferably 35% by mass or less and is preferably 10% by mass or more, more preferably 15% by mass or more, and further preferably 20% by mass or more.

An emulsion polymerized graft copolymer of a styrenic monomer-vinyl cyanide monomer and/or an alkyl (meth)acrylate monomer-rubbery polymer is used as the emulsion polymerized styrene-based resin (B).

Examples of the styrenic monomer include styrene and styrene derivatives such as α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene and tribromostyrene, with styrene being particularly preferred. It is possible to use one of these in isolation or a combination of two or more types thereof.

Preferred examples of other vinyl monomers able to be copolymerized with these styrenic monomers include vinyl cyanide monomers and/or alkyl (meth)acrylate monomers.

In the present specification "(meth)acrylate" means "acrylate" and/or "methacrylate". The same is true for "(meth)acrylic" and "(meth)acrylo".

Examples of vinyl cyanide monomers include acrylonitrile, methacrylonitrile and ethacrylonitrile, with acrylonitrile being most preferred. It is possible to use one of these or a combination of two or more thereof.

Examples of alkyl (meth)acrylate monomers include alkyl acrylate esters such as methyl acrylate, ethyl acrylate, propyl acrylate, butyl acrylate, amyl acrylate, hexyl acrylate, 2-ethylhexyl acrylate, octyl acrylate, cyclohexyl acrylate and dodecylacrylate;

aryl methacrylate esters such as phenyl methacrylate and benzyl methacrylate; alkyl methacrylate esters such as methyl methacrylate, ethyl methacrylate, propyl methacrylate, butyl methacrylate, amyl methacrylate, hexyl methacrylate, 2-ethylhexyl methacrylate, octyl methacrylate, cyclohexyl methacrylate and dodecyl methacrylate;

epoxy group-containing methacrylic acid esters such as glycidyl methacrylate; and aryl acrylate esters such as phenyl acrylate and benzyl acrylate.

It is possible to use one of these or a combination of two or more thereof.

Of these, alkyl acrylate esters and alkyl methacrylate esters are preferred.

Examples of other copolymerizable vinyl monomers include maleimide monomers such as maleimide, N-methylmaleimide, N-phenylmaleimide and N-cyclohexylmaleimide; and α,β-unsaturated carboxylic acids and anhydrides thereof, such as acrylic acid, methacrylic acid, glycidyl (meth)acrylate, glycidyl itaconate, maleic acid, maleic anhydride, phthalic acid and itaconic acid.

It is possible to use one of these vinyl monomers in isolation or a mixture of two or more types thereof.

In addition, a rubbery polymer that is copolymerizable with the styrenic monomer should be a rubber having a glass transition temperature of 10° C. or lower. Specific examples of this type of rubbery polymer include diene-based rubbers, acrylic rubbers, ethylene.propylene rubbers and silicone rubbers, with diene-based rubbers, acrylic rubbers, and the like, being preferred.

Examples of diene-based rubbers include polybutadiene, styrene-butadiene random copolymers and block copolymers, acrylonitrile-butadiene copolymers, copolymers of butadiene and lower alkyl esters of (meth)acrylic acid, such as butyl acrylate-butadiene copolymers and butadiene-methyl methacrylate copolymers, polyisoprene, ethylene-isoprene copolymers, butadiene-isoprene copolymers, terpolymers of ethylene, propylene and non-conjugated dienes, such as ethylene-propylene-butadiene copolymers and ethylene-propylene-hexadiene copolymers, and copolymers of butadiene, styrene and lower alkyl esters of (meth)acrylic acid.

Examples of acrylic rubbers include alkyl acrylate ester rubbers, and the number of carbon atoms in the alkyl group is preferably 1 to 8. Specific examples of alkyl acrylate esters include ethyl acrylate, butyl acrylate and ethylhexyl acrylate. Ethylenically unsaturated monomers may be used in the alkyl acrylate ester rubber. Specific examples of such compounds include di(meth)acrylates, divinylbenzene, trivinylbenzene, triallyl cyanurate, allyl (meth)acrylate, butadiene and isoprene. Other examples of acrylic rubbers include core-shell type polymers having a crosslinked diene-based rubber as the core.

Specific preferred examples of the emulsion polymerized styrene-based resin (B) include emulsion polymerized acrylonitrile-butadiene-styrene copolymers (ABS resins), methyl methacrylate-butadiene rubber-styrene copolymers (MBS resins), methyl methacrylate-acrylonitrile-butadiene-styrene copolymers (MABS resins), methyl methacrylate-butadiene rubber copolymers (MB resins), acrylonitrile-acrylic rubber-styrene copolymers (AAS resins), acrylonitrile-ethylene.propylene.diene rubber-styrene copolymers (AES resins), acrylonitrile-butadiene-styrene-α-methylstyrene copolymers and acrylonitrile-butadiene-styrene-N-phenylmaleimide copolymers, but of these, acrylonitrile-butadiene-styrene copolymers (ABS resins), methyl methacrylate-butadiene rubber-styrene copolymers (MBS resins) and methyl methacrylate-acrylonitrile-butadiene-styrene copolymers (MABS resins) can be advantageously used from the perspectives of improving wet heat resistance and reducing mold contamination during molding, and ABS resins are particularly preferred.

Moreover, it is possible to use the styrene-based resin (B) in isolation or a mixture of two or more types thereof.

In the present invention, the styrene-based resin (B) is produced by emulsion polymerization, but methods for producing the emulsion polymerized styrene-based resin (B) are publicly known, and it is possible to produce the styrene-based resin (B) using a publicly known method or use a commercially available emulsion polymerized product.

As an explanation of a method for producing the emulsion polymerized styrene-based resin (B) by means of emulsion polymerization, a typical method is as described below, using an ABS resin as an example.

In general, it is preferable to obtain a polymer latex by emulsion polymerizing a diene monomer using a rosin acid soap that is a salt of abietic acid or a higher fatty acid soap that is a salt of a saturated or unsaturated fatty acid having 12 to 32 carbon atoms as an emulsifier and using a water-soluble polymerization initiator such as potassium peroxodisulfate or α-cumyl hydroperoxide. Next, these polymer particles are polymerized with an aromatic vinyl monomer and a vinyl cyanide monomer in the presence of another emulsifier so as to obtain a polymer latex, and a coagulating agent such as an inorganic acid or divalent metal salt is added to the polymer latex so as to separate the ABS resin, which is then washed and dried.

Because the emulsifier is not completely removed in the washing step to the point where economy is not an issue, as mentioned above, the emulsifier and components derived therefrom remain in the emulsion polymerized ABS resin, abietic acid, and/or a higher fatty acid and salts thereof are contained in the emulsion polymerized product, and such emulsifier-derived components affect hydrolysis of the polycarbonate resin and cause a deterioration in wet heat resistance. In addition, oligomers remain in the emulsion polymerized styrene-based resin, and these oligomer components generate gas during molding, and are thought to form mold deposits and cause mold contamination.

The higher fatty acid is preferably a saturated or unsaturated fatty acid having 12 to 32 carbon atoms, with preferred examples thereof including oleic acid, stearic acid, palmitic acid and myristic acid, and examples of salts include alkali metal salts, especially sodium salts and potassium salts, and ammonium salts.

Abietic acid, and/or higher fatty acids and salts thereof are present as gas generating components in the obtained resin composition, generate gas during molding, form mold deposits, are a cause of mold contamination, affect hydrolysis of the polycarbonate resin, and cause a deterioration in wet heat resistance.

In addition, oligomers are present in the emulsion polymerized styrene-based resin, and it is thought that oligomer components cause mold contamination and generate gas. Oligomers are not particularly limited, but examples thereof include oligomers of monomers used to constitute the styrene-based resin (B), for example styrenic monomers, vinyl cyanide monomers and alkyl (meth)acrylate monomers.

As mentioned above, the polycarbonate resin composition of the present invention is such that the total amount of gas in cases where the resin composition is heated at 280° C. for 10 minutes is 3000 ppm or less in terms of mass of decane, while containing 40% to 5% by mass of the emulsion polymerized styrene-based resin (B). Because the total amount of gas is 3000 ppm or less in terms of mass, the polycarbonate resin composition of the present invention exhibits excellent mechanical properties and wet heat resistance and can solve the problem of mold contamination due to mold deposits. The total amount of gas is preferably 2700 ppm or less in terms of mass, and more preferably 2500 ppm or less in terms of mass, and the lower limit for this amount is preferably 500 ppm in terms of mass. If the total amount of gas is less than 500 ppm in terms of mass, mold release properties at the time of molding significantly deteriorate, and the appearance of a molded article, and especially the surface glossiness thereof, deteriorates, which is not desirable.

In addition, the amount of gas derived from the emulsifier can be 380 ppm or less in terms of mass, calculated in terms of mass of decane. By setting this amount to be 380 ppm or less in terms of mass, wet heat resistance can be significantly improved.

Here, gas generating components derived from the emulsifier means emulsifier components used when emulsion polymerizing the styrene-based resin (B), but as mentioned above, these are generally components derived from higher fatty acid soaps or rosin acid soaps, and are more specifically abietic acid, saturated or unsaturated fatty acids having 12 to 32 carbon atoms, or metal salts thereof. Specifically, when the resin composition is heated for 10 minutes at 280° C., the total amount of gas of abietic acid and saturated or unsaturated fatty acids having 12 to 32 carbon atoms is calculated in terms of mass of decane as the amount of gas derived from the emulsifier, and is preferably 380 ppm or less in terms of mass, and by setting the total amount of gas of abietic acid and saturated or unsaturated fatty acids having 12 to 32 carbon atoms to be 380 ppm or less in terms of mass, wet heat resistance can be significantly improved. This total amount is preferably 300 ppm or less in terms of mass, more preferably 200 ppm or less in terms of mass, and further preferably 100 ppm or less in terms of mass. In view of mold release properties at the time of molding and appearance of a molded article, the lower limit for this total amount is 50 ppm in terms of mass.

In addition, this generated gas also contains components derived from oligomers remaining in the styrene-based resins (B) and (C), but as mentioned above, these oligomer components cause the problem of mold contamination due to mold deposits and the like. Therefore, from the perspectives of wet heat resistance and the problem of mold contamination, it is particularly preferable for the total amount of gas to be 3000 ppm or less in terms of mass of decane when the resin composition is heated for 10 minutes at 280° C.

The polycarbonate resin composition of the present invention may further contain a styrene based resin (C) other than the emulsion polymerized styrene-based resin (B). Specifically, the polycarbonate resin composition contains 60% to 95% by mass of a polycarbonate resin (A), 40% to 5% by mass of an emulsion polymerized styrene-based resin (B) and 0% to 30% by mass of a styrene-based resin (C) other than the emulsion polymerized styrene-based resin based on 100% by mass of the total of (A) to (C).

The styrene-based resin (C) other than the emulsion polymerized styrene-based resin (B) is preferably a suspension polymerized or bulk polymerized styrene-based resin, and a suspension polymerized AS resin or bulk polymerized ABS resin is particularly preferred.

The suspension polymerized AS resin is a copolymer obtained by suspension polymerizing acrylonitrile and styrene, and may contain other components. Acrylonitrile preferably accounts for 10 to 50 mol %, and more preferably 15 to 40 mol %, of the monomers that constitute the AS resin. In addition, styrene preferably accounts for 50 to 90 mol %, and more preferably 60 to 85 mol %, of the monomers that constitute the AS resin.

The ABS resin is a resin obtained by copolymerizing a styrenic monomer, a vinyl cyanide monomer and a copolymerizable rubbery polymer, and preferably contains 40% to 80% by mass of a styrenic monomer component, 10% to 30% by mass of a vinyl cyanide monomer component, 10% to 30% by mass of a diene-based rubbery polymer component and 0% to 30% by mass of another copolymerizable vinyl-based monomer component.

The styrenic monomer, vinyl cyanide monomer, diene-based rubbery polymer and other copolymerizable vinyl-based monomer can be the same as those components mentioned above with respect to the emulsion polymerized styrene-based resin (B).

A bulk polymerized ABS resin produced by bulk polymerization is used as the ABS resin of the styrene-based resin (C). The bulk polymerization method should be a publicly known method, an example of which is a continuous bulk polymerization method. The polymerization method may be a single stage method or a multistage method.

The polycarbonate resin composition of the present invention is preferably produced using the method for producing a polycarbonate resin composition of the present invention, which is described above.

In the method for producing a polycarbonate resin composition of the present invention, a polycarbonate resin composition is produced by first melt kneading the emulsion polymerized styrene-based resin (B), which is a low content component, and then side feeding the polycarbonate resin (A), which is the main component. By using this type of method, a polycarbonate resin composition which exhibits excellent mechanical properties and wet heat resistance while being free from the problem of mold contamination due to mold deposits can be produced extremely efficiently with high productivity.

That is, the polycarbonate resin composition is produced by means of a method including melt kneading, in a vented twin screw extruder, a polycarbonate resin composition which contains 60% to 95% by mass of a polycarbonate resin (A) and 40% to 5% by mass of an emulsion polymerized styrene-based resin (B), based on 100% by mass of the total of (A) and (B), the extruder having a first raw material supply port on the upstream side and one or more second raw material supply ports on the downstream side thereof, when the supply quantity of the styrene-based resin (B) is denoted by B(1), supply quantity of the polycarbonate resin (A) supplied from the first raw material supply port is denoted by A(1) and supply quantity of the polycarbonate resin (A) supplied from the second raw material supply port is denoted by A(2), a sum of A(1) and A(2) is a total supply quantity of the polycarbonate resin (A), the method including:

supplying the styrene-based resin (B) and the polycarbonate resin (A) from the first raw material supply port so as to satisfy the following formula:

$$B(1) > A(1) \text{ where, } A(1) \text{ includes } 0;$$

degassing gas components under reduced pressure from a vent port following the melt kneading; and then supplying the polycarbonate resin (A) in the quantity A(2) from the second raw material supply port, which is located further downstream than the vent port.

In addition, in order to further increase the effect of reducing the amount of gas generated, it is preferable to inject water when melt kneading the emulsion polymerized styrene-based resin (B).

That is, the polycarbonate resin composition is produced by means of a method including melt kneading, in a vented twin screw extruder, a polycarbonate resin composition which contains 60% to 95% by mass of a polycarbonate resin (A) and 40% to 5% by mass of an emulsion polymerized styrene-based resin (B) based on 100% by mass of the total of (A) and (B), the extruder having a first raw material supply port on the upstream side, a water injection section and vent port in a mixing section on the downstream side of the first raw material supply port, and one or more second raw material supply ports on the downstream side of the mixing section, when supply quantity of the styrene-based resin (B) is denoted by B(1), supply quantity of the polycarbonate resin (A) supplied from the first raw material supply port is denoted by A(1) and supply quantity of the polycarbonate resin (A) supplied from the second raw material supply port is denoted by A(2), a sum of A(1) and A(2) is a total supply quantity of the polycarbonate resin (A), the method including:

supplying the styrene-based resin (B) and the polycarbonate resin (A) from the first raw material supply port so as to satisfy the following formula:

$$B(1) > A(1) \text{ where, } A(1) \text{ includes } 0;$$

injecting water from a water injection section provided in the mixing section, carrying out melt kneaded, and degassing gas components under reduced pressure from the vent port; and then supplying the polycarbonate resin (A) in the quantity A(2) from the second raw material supply port, which is located downstream of the vent port.

A vented twin screw extruder is used as an extruder having a depressurizing vent port in the method for producing a polycarbonate resin composition of the present invention, with the rotational direction of the screws being co-rotating or counter-rotating, but in order to efficiently remove gas generating components in the emulsion polymerized styrene-based resin (B), it is preferable to use a co-rotating twin screw extruder.

The extruder is provided with an uppermost first raw material supply port in the base part of the extruder, and a vent port disposed downstream of the first raw material supply port. The emulsion polymerized styrene-based resin (B) is supplied from the first raw material supply port. After the emulsion polymerized styrene-based resin (B) is heated and melted in the extruder, a depressurizing expansion region connected to the vent port is formed, and it is possible to degas the emulsion polymerized styrene-based resin (B) under reduced pressure by connecting a vacuum pump to the vent port and venting under reduced pressure. The position at which the vent port is disposed should be a molten part of the emulsion polymerized styrene-based resin (B). In addition, two or more vent ports may be provided if necessary.

It is preferable to supply a part of the polycarbonate resin (A) to the first raw material supply port, but it is preferable for the supply quantity of the polycarbonate resin (A) at this point to satisfy the formula $$B(1)>A(1),$$

as mentioned above, that is, it is preferable for the supply quantity of the polycarbonate resin (A) to be less than the supply quantity of the emulsion polymerized styrene-based resin (B). If the supply quantity (A1) of the polycarbonate resin (A) at the first supply port is not less than the supply quantity (B1) of the emulsion polymerized styrene-based resin (B), degassing of gas generating components derived from the emulsifier in the emulsion polymerized styrene-based resin (B) deteriorates. The reason for this is not clear, but because the emulsion polymerized styrene-based resin (B) is surrounded by the polycarbonate resin (A) in cases where there is an abundance of the polycarbonate resin (A), it is thought that degassing of emulsifier components in the emulsion polymerized styrene-based resin (B) does not progress.

Next, a quantity (A2) of the polycarbonate resin (A) is supplied from the downstream second raw material supply port. (A2) is the remaining quantity of the polycarbonate resin (A), and is determined by subtracting (A1) from the total supply quantity, and in cases where only the emulsion polymerized styrene-based resin (B) is supplied from the first supply port, that is, in cases where (A1)=0, (A2) is the total supply quantity of the polycarbonate resin (A). The polycarbonate resin (A) supplied from the second raw material supply port is mixed with the molten resin from upstream, and further melt kneaded.

According to this type of method for producing a polycarbonate resin composition of the present invention, by side feeding the polycarbonate resin (A), which is the main component in the polycarbonate resin composition of the present invention, the polycarbonate resin composition of the present invention can be produced extremely efficiently with high productivity.

As mentioned above, it is preferable for the polycarbonate resin composition of the present invention to contain a styrene-based resin (C) other than the emulsion polymerized styrene-based resin. In cases where the other styrene-based resin (C) is supplied, the other styrene-based resin (C) can be supplied from either the first supply port or the second supply port. Because an emulsifier is not contained in the case of the suspension polymerized AS resin and bulk polymerized ABS resin mentioned above, the other styrene-based resin may be supplied from the second supply port, but is preferably supplied from the first supply port in view of residual oligomers.

In order to further increase the advantageous effect of the present invention, it is preferable to inject water when melt kneading the emulsion polymerized styrene-based resin (B).

In such cases, the extruder is provided with an uppermost first raw material supply port in the base part of the extruder, an injection port for injecting water that is disposed downstream of the first raw material supply port, and a vent port disposed downstream of the injection port. The emulsion polymerized styrene-based resin (B) is supplied from the first raw material supply port, the styrene-based resin (B) is heated and melted in the extruder, water is then injected by means of a pump from the water injection port provided in the resin-filled region, and kneading is then carried out. The injected water is dispersed in the styrene-based resin (B). It is preferable to provide a sealing ring in the downstream part of this water injection and dispersion region so as to increase the pressure.

If the resin passes through the seal ring, a depressurizing expansion region connected to the vent port is formed, and water dispersed in the styrene-based resin (B) is foamed under reduced pressure. By connecting a vacuum pump to the vent port and venting under reduced pressure, the styrene-based resin (B) is foamed under reduced pressure, the dispersed surface area increases, and the partial pressure of volatilized components decreases, thereby lowering the equilibrium concentration and better facilitating degassing. The position at which the vent port is disposed should be a molten part of the styrene-based resin (B). In addition, two or more vent ports may be provided if necessary.

The degree of vacuum at the depressurizing vent is preferably 50 mm Hg or less, more preferably 20 mm Hg or less, and further preferably 10 mm Hg or less.

The vented twin screw extruder preferably has a water injection section and a vent port, and water injection and degassing under reduced pressure are preferably carried out in multiple stages. In such cases, in the first stage, the emulsion polymerized styrene-based resin (B) and the polycarbonate resin (A) are supplied from the first raw material supply port at quantities whereby $B(1)>A(1)$, as described above, and melted by heating, after which water is injected, kneading is carried out, and degassing is carried out by means of the depressurizing vent, and in the second stage on the downstream side, water injection, kneading and degassing by means of the depressurizing vent are carried out again. The water injection and degassing under reduced pressure steps in the second stage may be carried out a plurality of times.

The quantity of water injected is preferably 0.01% to 5% by mass, more preferably 0.1% by mass or more, and further preferably 0.5% by mass or more, and more preferably 3% by mass or less, further preferably 2% by mass or less, and particularly preferably 1% by mass or less, relative to 100% by mass of the styrene-based resin (B) and/or the polycarbonate resin (A) into which the water is being injected. If the quantity of water injected is 0.01% by mass or less, removal of gas generating components tends to be insufficient, and if the quantity of water injected exceeds 5% by mass, hydrolysis of the polymer occurs and physical properties tend to deteriorate.

In addition, the resin temperature (or preset temperature) when the resin supplied from the first raw material supply port is melt kneaded is preferably 240° C. to 350° C., and more preferably 250° C. to 350° C. The resin temperature (or preset temperature) downstream of the second raw material supply port is preferably 280° C. to 360° C., and more preferably 290° C. to 350° C.

Moreover, in order to replace all or some of the functions of the injected water explained above, water may be incorporated in the styrene-based resin (B) in advance. The quantity of water incorporated in advance is, like the quantity of water mentioned above, preferably 0.01% to 5% by mass.

[Stabilizer]

The polycarbonate resin composition of the present invention preferably contains a stabilizer, and a phosphorus-based stabilizer or phenol-based stabilizer is preferred as the stabilizer.

Any publicly known phosphorus-based stabilizer can be used as the phosphorus-based stabilizer. Specific examples thereof include oxoacids of phosphorus, such as phosphoric acid, phosphonic acid, phosphorous acid, phosphinic acid and polyphosphoric acid; acidic metal pyrophosphate salts, such as acidic sodium pyrophosphate, acidic potassium pyrophosphate and acidic calcium pyrophosphate; phosphate salts of group 1 or group 2B metals, such as potassium phosphate, sodium phosphate, cesium phosphate and zinc phosphate; organic phosphate compounds, organic phosphite compounds and organic phosphonite compounds, but organic phosphite compounds are particularly preferred.

Examples of organic phosphite compounds include triphenyl phosphite, tris(monononylphenyl) phosphite, tris(mononyl/dinonyl-phenyl) phosphite, tris(2,4-di-tert-butylphenyl) phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, 2,2-methylene-bis(4,6-di-tert-butylphenyl)octyl phosphite.

Specific examples of this type of organic phosphite compound include "ADK STAB 1178", "ADK STAB 2112" and "ADK STAB HP-10" manufactured by ADEKA Corporation, "JP-351", "JP-360" and "JP-3CP" manufactured by Johoku Chemical Co., Ltd., and "Irgafos 168" manufactured by BASF SE.

Moreover, it is possible to incorporate one phosphorus-based stabilizer or an arbitrary combination of two or more types thereof combined at arbitrary proportions.

The content of the phosphorus-based stabilizer is generally 0.001 parts by mass or higher, preferably 0.01 parts by mass or higher and more preferably 0.03 parts by mass or higher, and is generally 1 part by mass or lower, preferably 0.7 parts by mass or lower and more preferably 0.5 parts by mass or lower, relative to a total of 100 parts by mass of the polycarbonate resin (A) and the styrene-based resins (B) and (C). In cases where the content of the phosphorus-based stabilizer is lower than the lower limit of the range mentioned above, the thermal stabilizing effect may be insufficient, and in cases where the content of the phosphorus-based stabilizer is higher than the upper limit of the range mentioned above, the advantageous effect achieved by the stabilizer reaches its limit, which may lead to a deterioration in economy.

Examples of the phenol-based stabilizer include hindered phenol-based antioxidants. Specific examples thereof include pentaerythritol tetrakis[3-(3,5-di-tert-butyl-4-hydroxyphenyl) propionate], octadecyl-3-(3,5-di-tert-butyl-4-hydroxyphenyl) propionate, thiodiethylene-bis[3-(3,5-di-tert-butyl-4-hydroxyphenyl) propionate], N,N'-hexane-1,6-diyl-bis[3-(3,5-di-tert-butyl-4-hydroxyphenyl) propionamide], 2,4-dimethyl-6-(1-methylpentadecyl) phenol, diethyl[[3,5-bis(1,1-dimethylethyl)-4-hydroxyphenyl]methyl]phosphoate, 3,3',3",5,5',5"-hexa-tert-butyl-a,a',a"-(mesitylene-2,4,6-triyl)tri-p-cresol, 4,6-bis(octylthiomethyl)-o-cresol, ethylene-bis(oxyethylene)-bis [3-(5-tert-butyl-4-hydroxy-m-tolyl) propionate], hexamethylene-bis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazine-2-ylamino)phenol, 2-[1-(2-hydroxy-3,5-di-tert-pentylphenyl)ethyl]-4,6-di-tertpentylphenyl acrylate.

Of these, pentaerythritol tetrakis[3-(3,5-di-tert-butyl-4-hydroxyphenyl) propionate] and octadecyl-3-(3,5-di-tert-butyl-4-hydroxyphenyl) propionate are preferred. Specific examples of such phenol-based antioxidants include "Irganox 1010" and "Irganox 1076" manufactured by BASF SE and "ADK STAB AO-50" and "ADK STAB AO-60" manufactured by ADEKA Corporation.

Moreover, it is possible to incorporate one phenol-based stabilizer or an arbitrary combination of two or more types thereof combined at arbitrary proportions.

The content of the phenol-based stabilizer is generally 0.001 parts by mass or higher and preferably 0.01 parts by mass or higher, and is generally 1 part by mass or lower and preferably 0.5 parts by mass or lower, relative to a total of 100 parts by mass of the polycarbonate resin (A) and the styrene-based resins (B) and (C). In cases where the content of the phenol-based stabilizer is lower than the lower limit of the range mentioned above, the effect of the phenol-based stabilizer may be insufficient, and in cases where the content of the phenol-based stabilizer is higher than the upper limit of the range mentioned above, the advantageous effect achieved by the stabilizer reaches its limit, which may lead to a deterioration in economy.

Moreover, the stabilizers mentioned above and additives and other types of resin mentioned below, which are blended according to need, are preferably supplied from the second raw material supply port together with the polycarbonate resin (A).

[Release Agent]

The polycarbonate resin composition of the present invention preferably contains a release agent. At least one type of compound selected from the group consisting of aliphatic carboxylic acids, esters of aliphatic carboxylic acids and alcohols, aliphatic hydrocarbon compounds having number average molecular weights of 200 to 15,000 and polysiloxane-based silicone oils can be advantageously used as the release agent.

Saturated and unsaturated aliphatic monovalent, divalent and trivalent carboxylic acids can be used as the aliphatic carboxylic acid. Here, aliphatic carboxylic acids also include alicyclic carboxylic acids. Of these, monovalent and divalent carboxylic acids having 6 to 36 carbon atoms are preferred as the aliphatic carboxylic acid, and monovalent carboxylic acids having 6 to 36 carbon atoms are more preferred. Specific examples of such aliphatic carboxylic acids include palmitic acid, stearic acid, caproic acid, capric acid, lauric acid, archaic acid, behenic acid, lignoceric acid, cerotic acid, melissic acid, tetratriacontanoic acid, montanic acid, adipic acid and azelaic acid.

The same aliphatic acids as those mentioned above can be used as the aliphatic carboxylic acid in the esters of aliphatic carboxylic acids and alcohols. Meanwhile, saturated and unsaturated monohydric or polyhydric alcohols can be used as the alcohol. These alcohols may have substituent groups such as fluorine atoms or aryl groups. Of these, monohydric and polyhydric saturated alcohols having 30 or fewer carbon atoms are preferred, and aliphatic saturated monohydric and polyhydric alcohols having 30 or fewer carbon atoms are more preferred. Here, aliphatic compounds also include alicyclic compounds. Specific examples of such alcohols include octanol, decanol, dodecanol, stearyl alcohol, behenyl alcohol, ethylene glycol, diethylene glycol, glycerin, pentaerythritol, 2,2-dihydroxyperfluoropropanol, neopentyl glycol, ditrimethylolpropane and dipentaerythritol.

Specific examples of esters of aliphatic carboxylic acids and alcohols include bees wax (a mixture containing mainly myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate and pentaerythritol tetrastearate.

Examples of aliphatic hydrocarbons having number average molecular weights of 200 to 15,000 include liquid paraffins, paraffin waxes, micro-waxes, polyethylene waxes, Fischer-Tropsch waxes and α-olefin oligomers having 3 to 12 carbon atoms. Here, aliphatic hydrocarbons also include alicyclic hydrocarbons. In addition, these hydrocarbon compounds may be partially oxidized. Of these, paraffin waxes, polyethylene waxes and partially oxidized polyethylene waxes are preferred, and paraffin waxes and polyethylene waxes are more preferred. The number average molecular weight thereof is preferably 200 to 5000. These aliphatic hydrocarbons may be a single substance or a mixture of substances having a variety of constituent components and molecular weights, and the number average molecular weight of the primary component should fall within the range mentioned above.

Examples of polysiloxane-based silicone oils include dimethylsilicone oils, phenylmethylsilicone oils, diphenylsilicone oils and fluorinated alkylsilicones. It is possible to use a combination of two or more types of these.

In cases where a release agent is used, the content thereof is generally 0.05 to 2 parts by mass, and preferably 0.1 to 1 part by mass, relative to a total of 100 parts by mass of the polycarbonate resin (A) and the styrene-based resins (B) and (C). If the content of the release agent is not lower than the lower limit mentioned above, the release improvement effect can be sufficiently achieved, and if the content of the release agent is not higher than the upper limit mentioned above, it is possible to prevent problems such as a deterioration in hydrolysis resistance caused by an excess of the release agent and mold contamination during injection molding.

[Coloring Agents (Dyes and Pigments)]

The polycarbonate resin composition of the present invention preferably contains a coloring agent (a dye or pigment). Examples of coloring agents (dyes and pigments) include inorganic pigments, organic pigments and organic dyes.

Examples of inorganic pigments include carbon black, sulfide-based pigments such as cadmium red and cadmium yellow; silicate-based pigments such as ultramarine blue; oxide-based pigments such as hydrozincite, red iron oxide, chromium oxide, titanium oxide, iron black, titanium yellow, zinc-iron brown, titanium-cobalt green, cobalt green, cobalt blue, copper-chromium black and copper-iron black; chromic acid-based pigments such as chrome yellow and molybdate orange; and ferrocyanide-based pigments such as Prussian blue.

Examples of organic pigments and organic dyes include phthalocyanine-based dyes and pigments such as copper phthalocyanine blue and copper phthalocyanine green; azo-based pigments and dyes such as nickel azo yellow; condensed polycyclic dyes and pigments such as thioindigo-based, perynone-based, perylene-based, quinacridone-based, dioxazine-based, isoindolinone-based and quinophthalone-based pigments and dyes; and anthraquinone-based, heterocyclic and methyl-based pigments and dyes. It is possible to use a combination of two or more types of these. Of these, carbon black, titanium oxide and cyanine-based, quinoline-based, anthraquinone-based and phthalocyanine-based compounds, and the like, are preferred from the perspective of thermal stability.

In cases where the composition of the present invention contains a coloring agent (a pigment or dye), the content of the coloring agent (pigment or dye) is generally 5 parts by mass or less, preferably 3 parts by mass or less, and more preferably 2 parts by mass or less, relative to a total of 100 parts by mass of the polycarbonate resin (A) and the styrene-based resins (B) and (C). If the content of the coloring agent (pigment or dye) exceeds 5 parts by mass, impact resistance may be insufficient.

[Other Components]

The polycarbonate resin composition of the present invention may, if necessary, contain components other than those mentioned above as long as the required physical properties are not significantly impaired. Examples of such other components include resins other than those mentioned above and a variety of resin additives. Moreover, it is possible to incorporate one of these other components or an arbitrary combination of two or more types thereof combined at arbitrary proportions.

<Other Resins>

Examples of other resins include thermoplastic polyester resins such as poly(ethylene terephthalate), poly(trimethylene terephthalate) and poly(butylene terephthalate) resins; polyolefin resins such as polyethylene resins and polypropylene resins; polyamide resins; polyimide resins; polyetherimide resins; polyurethane resins; poly(phenylene ether) resins; poly(phenylene sulfide) resins; polysulfone resins; and a variety of elastomers.

Moreover, it is possible to incorporate one of these other resins or an arbitrary combination of two or more types thereof combined at arbitrary proportions.

<Resin Additives>

Examples of resin additives include flame retardants, ultraviolet absorbers, anti-static agents, anti-fogging agents, anti-blocking agents, fluidity-improving agents, plasticizers, dispersing agents and antimicrobial agents. Moreover, it is possible to incorporate one resin additive or an arbitrary combination of two or more types thereof combined at arbitrary proportions.

By side feeding the polycarbonate resin (A) from the second raw material supply port, as mentioned above, it was confirmed that the polycarbonate resin composition of the present invention has a morphology structure in which the styrene-based resin (B) is finely dispersed in the form of islands in a matrix of the polycarbonate resin (A). In addition, a characteristic of the polycarbonate resin composition of the present invention is that the styrene-based resin (B) has a low volume average dispersion diameter (dv) of 2.5 μm.

Because of this low volume average dispersion diameter, the resin composition of the present invention exhibits an excellent impact strength retention rate (wet heat resistance). Specifically, the Charpy impact strength (in accordance with ISO179-1 and 179-2, with a notch, 23° C.) retention rate after being subjected to a wet heat treatment for 400 hours at a temperature of 90° C. and a relative humidity of 95% is preferably 50% or more, more preferably 60% or more, further preferably 70% or more, and particularly preferably 80% or more.

Moreover, the morphology of the polycarbonate resin composition can be measured by observing a cross section of a molded article using an optical microscope, a SEM (scanning electron microscope), a TEM (transmission electron microscope), or the like.

Specifically, a cross section of a pellet is observed using a SEM, STEM or TEM analytical device at an accelerating voltage of 3 kV and a magnification of 400 to 10,000 times.

Figure 1:
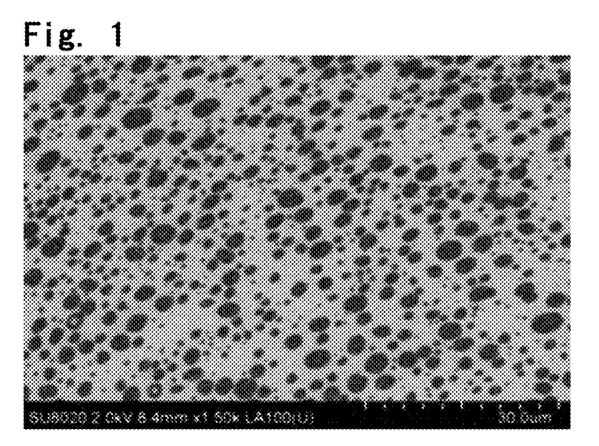
FIG. 1 is a SEM photograph of a core part of the molded article obtained in Example 1 (magnification 1500 times).
Figure 2:
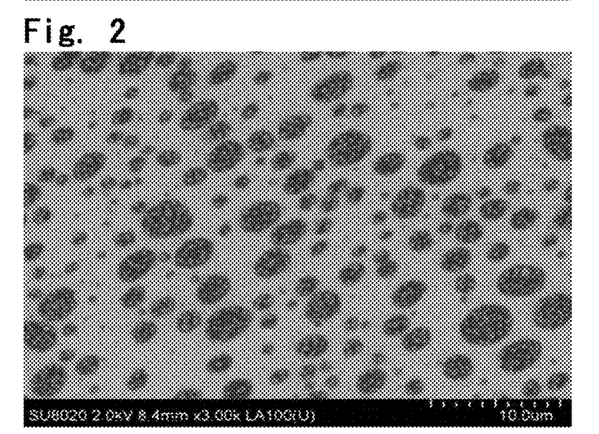
FIG. 2 is a SEM photograph of a core part of the molded article obtained in Example 1 (magnification 3000 times).

FIG. 1 and FIG. 2 are SEM photographs of cross sections of pellets obtained in Example 1 of the present invention, and show an example of the morphology of the resin composition of the present invention. FIG. 1 shows a magnification of 1500 times, and FIG. 2 shows a magnification of 3000 times.

Figure 3:
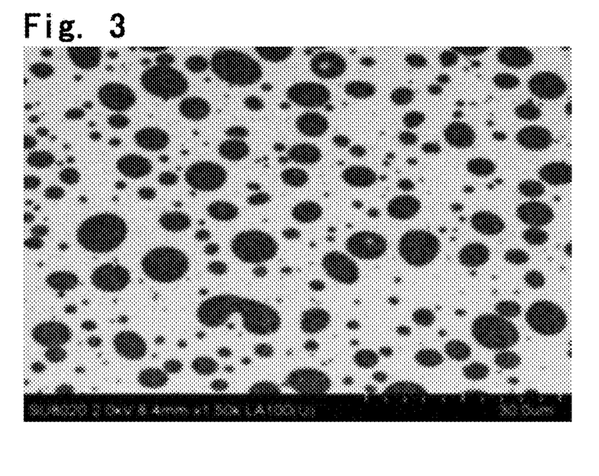
FIG. 3 is a SEM photograph of a core part of the molded article obtained in Comparative Example 1 (magnification 1500 times).
Figure 4:
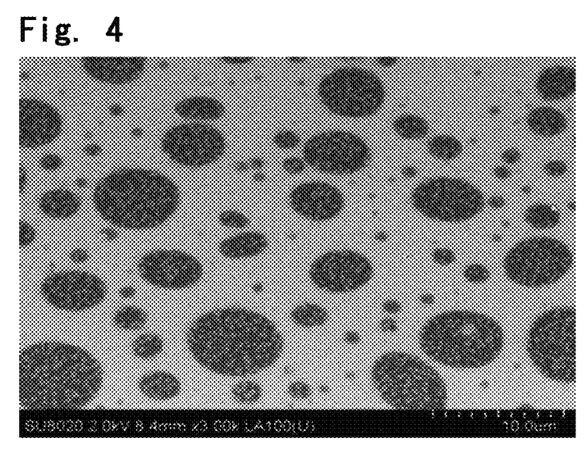
FIG. 4 is a SEM photograph of a core part of the molded article obtained in Comparative Example 1 (magnification 3000 times).

In FIG. 1, the white sea-like part is the polycarbonate resin matrix phase and the black island-like parts dispersed therein are ABS resin phases, which are finely and neatly dispersed in the polycarbonate resin phase. Meanwhile, FIG. 3 (magnification 1500 times) and FIG. 4 (magnification 3000 times) show the morphology of Comparative Example 1, but it can be understood that fine dispersion such as that seen in FIG. 1 and FIG. 2 could not be achieved.

The volume average particle diameter (dv) of the dispersed styrene-based resin of the styrene-based resin (B) phases in the polycarbonate resin is 2.5 µm or less, as mentioned above, is preferably 2.2 µm or less, more preferably 2.0 µm or less, and further preferably 1.5 µm or less, and is preferably 0.5 µm or more. If the volume average particle diameter (dv) exceeds 2.5 µm, the impact strength retention rate of the resin composition after a wet heat treatment tends to significantly decrease, which is not desirable.

In addition, the ratio (dv/dn) of the volume average particle diameter (dv) and the number average particle diameter (dn) of the styrene-based resin (B) dispersed in the polycarbonate resin preferably is within the range 1.0 to 1.5, is more preferably 1.1 or more and further preferably 1.15 or more, and is more preferably 1.45 or less and further preferably 1.4 or less.

Here, the numerical value of dv/dn is such that cases where the value of dv/dn is 1 indicate a uniform state in which dispersed particles of the styrene-based resin are uniform, and cases where the value of dv/dn is greater than 1 indicate a non-uniform state in which the diameters of dispersed particles are not uniform.

In addition, the value of dv/dn is closely related to the volume average diameter (dv) of the dispersed styrene-based resin in addition to showing that the diameters of dispersed particles are uniform. That is, even if the value of dv/dn is within the range 1.0 to 1.5, if the volume average particle diameter of the dispersed styrene-based resin increases, a wet heat resistance improvement effect is unlikely to be achieved.

Moreover, the average particle diameter (dn) and volume average particle diameter (dv) of the styrene-based resin (B) are determined by means of observations using a scanning electron microscope (SEM). Details of these observations are as disclosed in the examples.

It can be judged that the reason why the emulsion polymerized styrene-based resin (B) exhibits a morphology having this type of volume average particle diameter (dv) and dv/dn ratio is because the emulsion polymerized styrene-based resin (B) is melt kneaded well and degassing of emulsifier-derived components progresses to a high degree.

[Molded Body]

The polycarbonate resin composition of the present invention can form molded articles by means of a variety of molding methods, for example injection molding methods, ultra high-speed injection molding methods, injection compression molding methods, two-color molding methods, blow molding methods such as gas-assisted methods, molding methods that use heat insulating molds, molding methods that use rapidly heated molds, foaming molding methods (including supercritical fluids), insert molding methods, IMC (in-mold coating) molding methods, extrusion molding methods, sheet molding methods, thermoforming methods, rotational molding methods, lamination molding methods and press molding methods.

Examples of molded articles include parts for electrical and electronic devices, office automation equipment, information terminals, mechanical components, domestic appliances, motor vehicle components, construction materials, containers and lighting devices. Of these, the polycarbonate resin composition of the present invention is particularly suitable for parts for motor vehicle, electrical and electronic devices and office automation equipment.

EXAMPLES

The present invention will now be explained in greater detail through the use of examples. However, the present invention is not limited to the examples given below and may be arbitrarily altered as long as the gist of the present invention is not exceeded. Moreover, in the explanations given below, the term "parts" means "parts by mass" on a mass basis unless explicitly stated otherwise.

The components used in the examples and comparative examples below are as shown in Table 1 below.

TABLE 1

| Component | Symbol | |
|---|---|---|
| Polycarbonate resin (A) | A | Polycarbonate resin produced by interfacial polymerization using bisphenol A as starting material<br>Viscosity average molecular weight: 19,700 |
| Emulsion polymerized styrene-based resin (B) | B1 | ABS resin produced by emulsion polymerization<br>Manufactured by Nippon A & L Inc.,<br>Product name: Kralastic SXH-330 |
| | B2 | ABS resin produced by emulsion polymerization<br>Manufactured by Techno Polymer Co., Ltd.,<br>Product name: DP611 |
| | B3 | MBS resin produced by emulsion polymerization<br>Manufactured by Mitsubishi Rayon Co., Ltd.,<br>Product name: Metablen C-223A |
| Styrene-based resin (C) other than(B) | C1 | AS resin produced by suspension polymerization<br>Manufactured by Techno Polymer Co., Ltd.,<br>Product name: Sanrex 290FF |
| | C2 | ABS resin produced by bulk polymerization<br>Manufactured by Nippon A & L Inc.,<br>Product name: AT-08 |
| Release agent(D) | D1 | Stearyl stearate<br>Manufactured by NOF Corporation,<br>Product name: M9676 |
| | D2 | Pentaerythritol tetrastearate<br>Manufactured by Cognis Japan Ltd.,<br>Product name: Loxiol VPG861 |
| Stabilizer (E) | E1 | Phosphorus-based stabilizer<br>Tris(2,4-di-t-butylphenyl) phosphite<br>Manufactured by ADEKA Corporation,<br>product name: ADK STAB 2112 |
| | E2 | Phenol-based stabilizer<br>Pentaerythritol tetrakis[3-(3,5-di-t-butyl-4-hydroxyphenol) propionate]<br>Manufactured by BASF SE,<br>Product name: Irganox 1010 |
| Coloring agent(F) | F | Master batch comprising 40% by mass of carbon black and 60% by mass of polystyrene resin<br>Manufactured by Ecca Co., Ltd.,<br>Product name: Royal Black 948G |

Example 1

A "TEX-44αII" co-rotating screw type twin screw extruder manufactured by the Japan Steel Works, Ltd. (screw diameter 47 mm, L/D=59.5) was used. This extruder has a first raw material supply port in the base, has a water injection port and a vent port in a kneading zone, then has a second raw material supply port, a water injection port and a vent port, and the second raw material supply port is provided with a side feeder ("TSF-45E" manufactured by Kubota Corporation), from which materials are supplied. The screw arrangement is such that a full flight screw part for transporting, a kneading screw part for plasticizing and a kneading screw part for mixing are provided from the supply part side, and a full flight screw part for transporting and a kneading screw part for mixing are provided for the second raw material supply port.

An emulsion polymerized ABS resin (B1) shown in Table 1 was continuously supplied from the first raw material supply port at a supply rate of 105 kg/hr (corresponding to 30 parts by mass). At a screw rotational speed of 800 rpm and a preset cylinder temperature of 330° C., water was injected at a rate of 0.88 kg/hr (a proportion of 0.25% by mass relative to the total discharge quantity) from the water injection port provided in the lower half of the kneading screw part in a state whereby the resin was molten in the kneading screw part for plasticizing. A sealing ring was provided further down the kneading screw part, the resin-water mixture was kneaded while increasing the pressure by means of the kneading screw part for mixing, the vent port provided downstream thereof was evacuated to a pressure of 20 mm Hg, and foaming and degassing was carried out in a state whereby the resin-water mixture was foamed while dispersed.

Next, a pre-blend of polycarbonate resin (A) shown in Table 1 and release agents (D1, D2), stabilizers (E1, E2) and coloring agent (F) shown in Table 1 were continuously supplied from the second supply port at a supply rate of 245 kg/hr (corresponding to 70 parts by mass). Moreover, this pre-blend was blended so that the content of each of components D1 and D2 was 0.10% by mass, the content of components E1 and E2 was 0.03% by mass and 0.05% by mass respectively and the content of component F was 0.5% by mass, relative to 100% by mass of the final resin composition.

The polycarbonate resin pre-blend was kneaded while mixing the degassed ABS resin from upstream at a cylinder preset temperature of 330° C., and water was again injected from the water injection port at a rate of 0.88 kg/hr (a proportion of 0.25% by mass relative to the total discharge quantity). The resin-water mixture was kneaded while increasing the pressure by means of the kneading screw part for mixing, foaming and degassing was carried out by evacuating the vent port to a pressure of 20 mm Hg, extruding into strands, and then cutting the strands so as to obtain resin composition pellets.

The motor current during extrusion was 236 A, the resin temperature at the die outlet was 333° C., and the resin pressure at the die tip was 1.1 MPa. These are important criteria because it is preferable for the load on the motor to be low in view of the long term operational stability of the extruder, and it is generally preferable for the resin temperature to be low in order to suppress decomposition of the resin composition.

Example 2

Resin composition pellets were obtained in the same way as in Example 1, except that the quantity of water injected in the first and second stage water injection was 0.5% by mass, as shown in Table 2.

Example 3

Resin composition pellets were obtained in the same way as in Example 1, except that the cylinder preset temperature was 300° C. and the first and second stage water injection was not carried out, as shown in Table 2.

Example 4

Resin composition pellets were obtained in the same way as in Example 2, except that the second stage water injection was not carried out and the degree of vacuum at the vent port was 10 mm Hg, as shown in Table 2.

Example 5

Resin composition pellets were obtained in the same way as in Example 2, except that the polycarbonate resin pre-blend was supplied from the first raw material supply port at a supply rate of 87.5 kg/hr (corresponding to 25 parts by mass), the ABS resin (B1) was supplied from the first raw material supply port at a supply rate of 105 kg/hr (corresponding to 30 parts by mass), the polycarbonate resin was supplied from the second supply port at a supply rate of 157.5 kg/hr (corresponding to 45 parts by mass), and the degree of vacuum at the vent port was 10 mm Hg, as shown in Table 2.

Example 6

Resin composition pellets were obtained in the same way as in Example 1, except that the emulsion polymerized ABS resin (B2) shown in Table 1 was supplied at a supply rate of 52.5 kg/hr (corresponding to 15 parts by mass) and the suspension polymerized AS resin (C1) shown in Table 1 was supplied at a supply rate of 52.5 kg/hr (corresponding to 15 parts by mass) as styrene-based resins supplied to the first raw material supply port, and the degree of vacuum at the vent port was 10 mm Hg, as shown in Table 3.

Example 7

Resin composition pellets were obtained in the same way as in Example 5, except that the styrene-based resin supplied to the first raw material supply port was changed to the emulsion polymerized MBS resin (B3) and suspension polymerized AS resin (C1) shown in Table 1, which were supplied at the quantities shown in Table 2, and the quantity of water injected was 1.0% by mass in the first and second stage water injection, as shown in Table 3.

Example 8

As shown in Table 3, resin composition pellets were obtained in the same way as in Example 1, except that the emulsion polymerized ABS resin (B1) and bulk polymerized ABS resin (C2) were supplied from the first raw material supply port at the quantities shown in Table 3.

Example 9

As shown in Table 3, resin composition pellets were obtained in the same way as in Example 1, except that the emulsion polymerized ABS resin (B1) shown in Table 1 was supplied at a supply rate of 140 kg/hr (corresponding to 40 parts by mass) as a styrene-based resin supplied to the first raw material supply port, and the polycarbonate resin pre-blend was supplied from the second raw material supply port at a supply rate of 210 kg/hr (corresponding to 60 parts by mass).

Example 10

Resin composition pellets were obtained in the same way as in Example 1, except that the emulsion polymerized ABS resin (B2) shown in Table 1 was supplied at a supply rate of 28 kg/hr (corresponding to 8 parts by mass) as a styrene-based resin supplied to the first raw material supply port, the polycarbonate resin pre-blend was supplied from the second raw material supply port at a supply rate of 322 kg/hr (corresponding to 92 parts by mass), and the degree of vacuum at the vent port was 10 mm Hg, as shown in Table 3.

Comparative Example 1

Resin composition pellets were obtained in the same way as in Example 3, except that the polycarbonate resin pre-blend was supplied from the first raw material supply port at a supply rate of 245 kg/hr (corresponding to 70 parts by mass), the ABS resin (B1) was supplied from the first raw material supply port at a supply rate of 105 kg/hr (corresponding to 30 parts by mass), and the polycarbonate resin was not supplied from the second supply port, as shown in Table 4.

Comparative Example 2

Resin composition pellets were obtained in the same way as in Example 2, except that the polycarbonate resin pre-blend was supplied from the first raw material supply port at a supply rate of 245 kg/hr (corresponding to 70 parts by mass), the ABS resin (B1) was supplied from the first raw material supply port at a supply rate of 105 kg/hr (corresponding to 30 parts by mass), and the polycarbonate resin was not supplied from the second supply port, as shown in Table 4.

Comparative Examples 3 and 4

Resin composition pellets were obtained in the same way as in Example 2, except that the cylinder preset temperature was 300° C., the polycarbonate resin pre-blend was supplied from the first raw material supply port at a supply rate of 140 kg/hr (corresponding to 40 parts by mass), the ABS resin (B1) was supplied from the first raw material supply port at a supply rate of 105 kg/hr (corresponding to 30 parts by mass) and the polycarbonate resin was supplied from the second supply port at a supply rate of 105 kg/hr (corresponding to 30 parts by mass), as shown in Table 4, and the quantity of water injected in the first and second stage water injection and the degree of vacuum at the vent port were as shown in Table 3.

Comparative Example 5

Resin composition pellets were obtained in the same way as in Example 7, except that the polycarbonate resin pre-blend was supplied from the first raw material supply port at a supply rate of 245 kg/hr (corresponding to 70 parts by mass) and the polycarbonate resin was not supplied from the second supply port, as shown in Table 4, and the quantity of water injected in the first and second stage water injection was as shown in Table 4.

Comparative Example 6

Resin composition pellets were obtained in the same way as in Comparative Example 2, except that the emulsion polymerized ABS resin (B1) shown in Table 4 was supplied at a supply rate of 175 kg/hr (corresponding to 50 parts by mass) as a styrene-based resin supplied to the first raw material supply port, and the polycarbonate resin pre-blend was supplied from the second raw material supply port at a supply rate of 175 kg/hr (corresponding to 50 parts by mass).

Comparative Example 7

Resin composition pellets were obtained in the same way as in Comparative Example 6, except that the emulsion polymerized ABS resin (B1) shown in Table 4 was supplied at a supply rate of 10.5 kg/hr (corresponding to 3 parts by mass) and the bulk polymerized ABS resin (C2) was supplied at a supply rate of 112 kg/hr (corresponding to 32 parts by mass) as styrene-based resins supplied to the first raw material supply port, and the polycarbonate resin pre-blend was supplied from the second raw material supply port at a supply rate of 227.5 kg/hr (corresponding to 65 parts by mass).

[Measurement of Amount of Gas Components in Resin Composition]

Approximately 20 mg of resin composition pellets obtained in the manner described above was placed in a quartz glass sample tube, heated for 10 minutes at 280° C. in a helium gas stream (60 ml/min) using a TD-20 GCMS thermal desorption system manufactured by Shimadzu Corporation, and generated gas was cooled and trapped in a Tenax tube, desorbed by heating, and then analyzed by means of gas chromatography/mass spectrometry (GC/MS) including GC-2010 Plus and GCMS-QP2010 Ultra.

Separation column: UA-5 manufactured by Frontier Laboratories Ltd.

Heating conditions: 50° C. to 380° C. at 10° C./min

Carrier gas: Helium 3 ml/min

With respect to obtained gases, emulsifier-derived components, styrene-based resin oligomers and other components (polycarbonate resin oligomers, polycarbonate resin raw material monomers, release agent, and the like) were measured in terms of decane. Moreover, quantities of abietic acid and saturated or unsaturated fatty acids having 12 to 32 carbon atoms were measured as emulsifier-derived components. Oleic acid, stearic acid, palmitic acid and myristic acid were detected as fatty acids at the quantities shown in Tables 2 to 4 (units: mass ppm).

[Mold Contamination]

Figure 5:
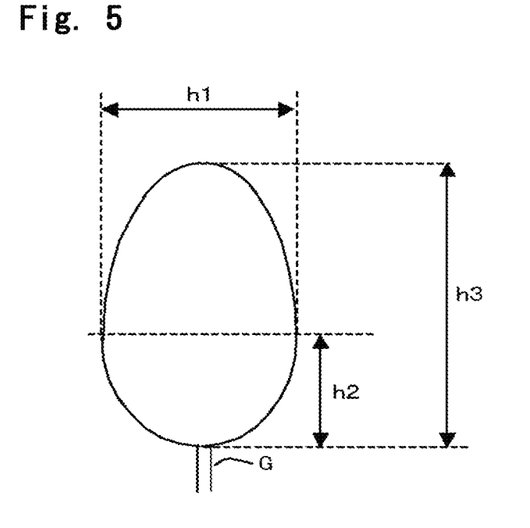
FIG. 5 is a planar view of a droplet-shaped mold used to evaluate mold contamination.

Using a Minimat M8/7A molding machine manufactured by Sumitomo Heavy Industries, Ltd., 100 shots were continuously molded using a droplet-shaped mold such as that shown in FIG. 5 at a cylinder temperature of 260° C., a mold temperature of 60° C., an extrusion rate of 10 mm/sec, a molding cycle time of 9 seconds, a holding pressure of 75 MPa for 1.5 sec and a cooling time of 2 seconds, and following completion of the molding, the state of mold deposits was observed with the naked eye and evaluated according to the four levels below, from ⊗ to X.

The droplet-shaped mold shown in FIG. 5 is a mold designed so that a resin composition is introduced from a gate G and generated gas can be easily held in the end portion. The gate G has a width of 1 mm and a thickness of 1 mm, and in FIG. 5, the width h1 is 14.5 mm, the length h2 is 7 mm, the length h3 is 27 mm and the thickness of the molding part is 3 mm.

<State of Mold Deposits>

⊗: Almost no mold deposits, mold contamination extremely good

○: Few mold deposits, mold contamination good

Δ: Many mold deposits, mold contamination poor

X: Mold entirely covered with deposits, mold contamination extremely poor

[Evaluation of Release Properties]

Release properties under the molding conditions described above were evaluated according to the following three levels.

○: 50 or more shots could be continuously molded without defects

Δ: Release defects occurred after at least 10 and less than 50 shots (molded articles did not drop under their own weight from the ejector pin)

X: At least 1 and less than 10 shots could be continuously molded

[Evaluation of Appearance]

Molded articles obtained under the molding conditions described above were evaluated visually in terms of appearance according to the criteria below.

○: Excellent surface glossiness

Δ: Surface glossiness somewhat poor

X: Surface glossiness low, occurrence of surface roughness or warping

[Wet Heat Resistance]

Wet heat resistance was evaluated on the basis of impact strength retention rate following the wet heat treatment described below.

ISO multipurpose test pieces (having thicknesses of 3 mm) were produced by drying pellets obtained using the production method described above for 5 hours at 100° C. and then using an injection molding machine (Sai Cap M-2, manufactured by Sumitomo Heavy Industries, Ltd., mold clamping force 75 T) at a cylinder temperature of 250° C. and a mold temperature of 70° C.

<Impact Strength Retention Rate Following Wet Heat Treatment>

An ISO multipurpose test piece (thickness 3 mm) described above was subjected to a wet heat treatment for 400 hours in an environment having a temperature of 90° C. and a relative humidity of 95%. The notched Charpy impact strength (units: kJ/m$^2$) of the test piece before and after the wet heat treatment was measured at 23° C. in accordance with ISO179.

The impact strength retention rate following wet heat treatment was calculated using the following expression.

Impact strength retention rate (%) following wet heat treatment={(impact strength following wet heat treatment)/(impact strength before wet heat treatment)}×100(%)

[Wet Heat Resistance]

Wet heat resistance was evaluated according to the rate of increase in MFR following wet heat treatment.

That is, resin composition pellets were dried for 5 hours or longer at 100° C., the MFR (melt flow rate, units: g/10 min) after a wet heat treatment for 400 hours in an environment having a temperature of 90° C. and a relative humidity of 95% was measured in accordance with ISO1133 at a measurement temperature of 250° C. and a load of 2.16 kgf, and the rate of increase in MFR (units: %) following the wet heat treatment was determined using the following expression.

Rate of increase (%) in MFR following wet heat treatment={(MFR following wet heat treatment)/(MFR before wet heat treatment)}×100−100(%)

A lower rate of increase (%) in MFR following wet heat treatment means better wet heat resistance.

[Morphology Observations]

A cross section of an obtained pellet was prepared using a UC7 ultramicrotome system for sample preparation manufactured by Leica Microsystems (a diamond knife), a film having a thickness of 25 nm was vapor deposited using a C source using a VES-10 Multicoater manufactured by Vacuum Device, an image was obtained using SEM observations (apparatus: SU8020 manufactured by Hitachi High-Technologies Corporation, measurement conditions: 3 kV, magnification 400 to 10,000 times, direction perpendicular to direction of flow), and the image was analyzed using "Azokun" image analysis software produced by Asahi Kasei Engineering Corporation.

When true circle conversion was performed from a cross section of a dispersed particle of a styrene-based resin as a result of the image analysis, the diameter (dnj) was calculated from the expression below, and the number average particle diameter (dn), volume average particle diameter (dv) and ratio (dv/dn) of volume average particle diameter (dv) to number average particle diameter (dn) were determined.

When true circle conversion was performed from a cross section of a dispersed particle of a styrene-based resin, the calculation expression for the diameter (dnj) is as follows.

$$d_{ni} = \sqrt{\frac{4}{\pi} \cdot A} \qquad \text{[Math. 1]}$$

In the expression above, A is the area of a dispersed styrene-based resin particle, as determined by subjecting a SEM photograph to image analysis.

The calculation expression for the number average particle diameter (dn) of a dispersed styrene-based resin is as follows.

$$d_n = \frac{\sum_i d_{nj}}{n} \qquad \text{[Math. 2]}$$

The calculation expression for the volume average particle diameter (dv) of a dispersed styrene-based resin is as follows.

$$d_v = \sqrt[3]{\frac{\sum_i d_{nj}^3}{n}} \qquad \text{[Math. 3]}$$

The evaluation results above are shown in Tables 2 to 4.

TABLE 2

|  |  | Example 1 | Example 2 | Example 3 | Example 4 | Example 5 |
|---|---|---|---|---|---|---|
| Quantity (%) of PC resin (A) and additives | | 70 | 70 | 70 | 70 | 70 |
| Quantity (%) of emulsion polymerized styrene-based resin (B) | | 30 | 30 | 30 | 30 | 30 |
| Quantity (%) of styrene-based resin (C) other than (B) | | — | — | — | — | — |
| Emulsion polymerized styrene-based resin(B) | Supply point | First supply port | First supply port | First supply port | First supply port | First supply port |
| | Supplied quantity (B1) of B1 (parts) | 30 | 30 | 30 | 30 | 30 |
| | Supplied quantity (B1) of B2 (parts) | — | — | — | — | — |
| | Supplied quantity (B1) of B3 (parts) | — | — | — | — | — |
| Styrene-based resin(C) other than(B) | Supply point | — | — | — | — | — |
| | Supplied quantity of C1 (parts) | — | — | — | — | — |
| | Supplied quantity of C2 (parts) | — | — | — | — | — |
| PC resin-additive mixture | Supplied quantity (A1) from first supply port (parts) | — | — | — | — | 25 |
| | Supplied quantity (A2) from second supply port (parts) | 70 | 70 | 70 | 70 | 45 |
| Water injection | First kneading zone (injected quantity: %) | 0.25 | 0.5 | — | 0.5 | 0.5 |
| | Second kneading zone (injected quantity: %) | 0.25 | 0.5 | — | — | 0.5 |
| Extrusion conditions | Cylinder preset temperature (° C.) | 330 | 330 | 300 | 330 | 330 |
| | Vent vaccum (mm Hg) | 20 | 20 | 20 | 10 | 10 |
| Extrusion results | Motor current (A) | 236 | 249 | 233 | 237 | 240 |
| | Resin temperature (° C.) | 333 | 321 | 335 | 334 | 338 |
| | Resin pressure (MPa) at tip | 1.1 | 1.3 | 1.4 | 1.4 | 1.2 |
| Generated gas (mass ppm) | Abietic acid | 170 | 210 | 210 | 200 | 240 |
| | Oleic acid | 70 | 80 | 140 | 70 | 110 |
| | Stearic acid | Not detected | Not detected | Not detected | Not detected | Not detected |
| | Palmitic acid | Not detected | Not detected | Not detected | Not detected | Not detected |
| | Myristic acid | Not detected | Not detected | Not detected | Not detected | Not detected |
| | Sub-total | 240 | 290 | 350 | 270 | 350 |
| | ABS oligomer | 760 | 1150 | 1170 | 1140 | 1210 |
| | MBS oligomer | — | — | — | — | — |
| | AS oligomer | — | — | — | — | — |
| | Other components | 1090 | 1000 | 900 | 840 | 920 |
| | Total gas generated | 2090 | 2440 | 2420 | 2250 | 2480 |
| Resin (B) particle diameter | Number average particle diameter (dn) | 1.39 | 1.44 | 1.64 | 1.43 | 1.53 |
| | Volume average particle diameter (dv) | 1.84 | 1.98 | 2.44 | 2.01 | 2.21 |
| | dv/dn | 1.32 | 1.37 | 1.49 | 1.41 | 1.44 |
| Mold contamination | | ⊗ | ⊗ | ◯ | ◯ | Δ |
| Mold release properties | | ◯ | ◯ | ◯ | ◯ | ◯ |
| Appearance | | ◯ | ◯ | ◯ | ◯ | ◯ |
| Impact resistance | Before wet heat treatment(kJ/m$^2$) | 64 | 65 | 61 | 62 | 58 |
| | After wet heat treatment(kJ/m$^2$) | 56 | 58 | 35 | 57 | 30 |
| | Retention rate (%) | 88 | 89 | 57 | 92 | 52 |
| MFR | Before wet heat treatment(g/10 min) | 9.3 | 9.2 | 9.3 | 9.3 | 9.6 |
| | After wet heat treatment(g/10 min) | 12.4 | 12.9 | 14.5 | 13.5 | 18.8 |
| | Rate of increase (%) | 33 | 40 | 56 | 47 | 96 |

TABLE 3

|  |  | Example 6 | Example 7 | Example 8 | Example 9 | Example 10 |
|---|---|---|---|---|---|---|
| Quantity (%) of PC resin (A) and additives | | 70 | 70 | 70 | 60 | 92 |
| Quantity (%) of emulsion polymerized styrene-based resin (B) | | 15 | 20 | 20 | 40 | 8 |
| Quantity (%) of styrene-based resin (C) other than (B) | | 15 | 10 | 10 | — | — |
| Emulsion polymerized styrene-based resin(B) | Supply point | First supply port | First supply port | First supply port | First supply port | First supply port |
| | Supplied quantity (B1) of B1 (parts) | — | — | 20 | 40 | — |
| | Supplied quantity (B1) of B2 (parts) | 15 | — | — | — | 8 |
| | Supplied quantity (B1) of B3 (parts) | — | 20 | — | — | — |

TABLE 3-continued

|  |  | Example | | | | |
|---|---|---|---|---|---|---|
|  |  | 6 | 7 | 8 | 9 | 10 |
| Styrene-based resin(C) other than(B) | Supply point | First supply port | First supply port | First supply port | — | — |
|  | Supplied quantity of C1 (parts) | 15 | 10 | — | — | — |
|  | Supplied quantity of C2 (parts) | — | — | 10 | — | — |
| PC resin-additive mixture | Supplied quantity (A1) from first supply port (parts) | — | 15 | — | — | — |
|  | Supplied quantity (A2) from second supply port (parts) | 70 | 55 | 70 | 60 | 92 |
| Water injection | First kneading zone (injected quantity: %) | 0.25 | 1.0 | 0.25 | 0.25 | 0.25 |
|  | Second kneading zone (injected quantity: %) | 0.25 | 1.0 | 0.25 | 0.25 | 0.25 |
| Extrusion conditions | Cylinder preset temperature (° C.) | 330 | 330 | 330 | 330 | 330 |
|  | Vent vaccum (mm Hg) | 10 | 10 | 20 | 20 | 10 |
| Extrusion results | Motor current (A) | 233 | 246 | 235 | 240 | 233 |
|  | Resin temperature (°c) | 320 | 320 | 331 | 330 | 335 |
|  | Resin pressure (MPa) at tip | 1.3 | 1.4 | 1.1 | 1.1 | 1.7 |
| Generated gas (mass ppm) | Abietic acid | 230 | 200 | 130 | 210 | 80 |
|  | Oleic acid | 40 | 100 | 50 | 80 | 30 |
|  | Stearic acid | 20 | 60 | Not detected | Not detected | 20 |
|  | Palmitic acid | 20 | 20 | Not detected | Not detected | 10 |
|  | Myristic acid | Not detected | Not detected | Not detected | Not detected | Not detected |
|  | Sub-total | 310 | 380 | 180 | 290 | 140 |
|  | ABS oligomer | 110 | — | 620 | 800 | 60 |
|  | MBS oligomer | — | 290 | — | — | — |
|  | AS oligomer | 1460 | 1400 | — | — | — |
|  | Other components | 580 | 340 | 910 | 1050 | 460 |
|  | Total gas generated | 2460 | 2410 | 1710 | 2140 | 660 |
| Resin (B) particle diameter | Number average particle diameter (dn) | 1.48 | 1.50 | 1.33 | 1.40 | 1.48 |
|  | Volume average particle diameter (dv) | 2.17 | 2.23 | 1.87 | 1.92 | 2.17 |
|  | dv/dn | 1.47 | 1.49 | 1.41 | 1.37 | 1.47 |
| Mold contamination |  | ◯ | Δ | ⊗ | ⊗ | ◯ |
| Mold release properties |  | Δ | ◯ | Δ | ◯ | Δ |
| Appearance |  | Δ | Δ | Δ | ◯ | Δ |
| Impact resistance | Before wet heat treatment(kJ/m$^2$) | 60 | 56 | 60 | 65 | 68 |
|  | After wet heat treatment(kJ/m$^2$) | 42 | 40 | 58 | 59 | 66 |
|  | Retention rate (%) | 70 | 71 | 97 | 91 | 97 |
| MFR | Before wet heat treatment(g/10 min) | 8.8 | 9.6 | 9.2 | 10.3 | 7.8 |
|  | After wet heat treatment(g/10 min) | 14.2 | 17.7 | 11.9 | 13.4 | 10.4 |
|  | Rate of increase (%) | 61 | 84 | 29 | 30 | 33 |

TABLE 4

|  |  | Comparative Example | | | | | | |
|---|---|---|---|---|---|---|---|---|
|  |  | 1 | 2 | 3 | 4 | 5 | 6 | 7 |
| Quantity (%) of PC resin (A) and additives |  | 70 | 70 | 70 | 70 | 70 | 50 | 65 |
| Quantity (%) of emulsion polymerized styrene-based resin (E) |  | 30 | 30 | 30 | 30 | 20 | 50 | 3 |
| Quantity (%) of styrene-based resin (C) other than (B) |  | — | — | — | — | 10 | — | 32 |
| Emulsion polymerized styrene-based resin(B) | Supply point | First supply port | First supply port | First supply port | First supply port | First supply port | First supply port | First supply port |
|  | Supplied quantity (B1) of B1 (parts) | 30 | 30 | 30 | 30 | — | 50 | 3 |
|  | Supplied quantity (B1) of B2 (parts) | — | — | — | — | — | — | — |
|  | Supplied quantity (B1) of B3 (parts) | — | — | — | — | 20 | — | — |
| Styrene-based resin(C) other than(B) | Supply point | — | — | — | — | First supply port | — | First supply port |
|  | Supplied quantity of C1 (parts) | — | — | — | — | 10 | — | — |
|  | Supplied quantity of C2 (parts) | — | — | — | — | — | — | 32 |
| PC resin-additive mixture | Supplied quantity (A1) from first supply port (parts) | 70 | 70 | 40 | 40 | 70 | — | — |
|  | Supplied quantity (A2) from second supply port (parts) | — | — | 30 | 30 | — | 50 | 65 |

TABLE 4-continued

|  |  | Comparative Example | | | | | | |
|---|---|---|---|---|---|---|---|---|
|  |  | 1 | 2 | 3 | 4 | 5 | 6 | 7 |
| Water injection | First kneading zone (injected quantity: %) | — | 0.5 | 0.5 | 1.0 | 0.25 | 0.5 | 0.5 |
|  | Second kneading zone (injected quantity: %) | — | 0.5 | 0.5 | 1.0 | 0.25 | 0.5 | 0.5 |
| Extrusion conditions | Cylinder preset temperature (° C.) | 300 | 330 | 300 | 300 | 330 | 300 | 300 |
|  | Vent vaccum (mm Hg) | 20 | 20 | 20 | 10 | 10 | 20 | 20 |
| Extrusion results | Motor current (A) | 251 | 271 | 259 | 259 | 260 | 248 | 240 |
|  | Resin temperature (° C.) | 322 | 357 | 324 | 322 | 320 | 319 | 322 |
|  | Resin pressure (MPa) at tip | 1.2 | 0.8 | 1.0 | 1.0 | 1.0 | 1.1 | 1.3 |
| Generated gas (mass ppm) | Abietic acid | 290 | 230 | 230 | 290 | 330 | 530 | 20 |
|  | Oleic acid | 250 | 160 | 170 | 180 | 140 | 310 | 10 |
|  | Stearic acid | Not detected | Not detected | Not detected | Not detected | 90 | Not detected | Not detected |
|  | Palmitic acid | Not detected | Not detected | Not detected | Not detected | 20 | Not detected | Not detected |
|  | Myristic acid | Not detected | Not detected | Not detected | Not detected | Not detected | Not detected | Not detected |
|  | Sub-total | 540 | 390 | 400 | 470 | 580 | 840 | 30 |
|  | ABS oligomer | 2290 | 2090 | 1510 | 1440 | — | 2710 | 380 |
|  | MBS oligomer | — | — | — | 380 | — | — | — |
|  | AS oligomer | — | — | — | — | 2100 | — | — |
|  | Other components | 2090 | 1480 | 1310 | 1200 | 2770 | 1400 | 20 |
|  | Total gas generated | 4920 | 3960 | 3220 | 3110 | 5830 | 4950 | 430 |
| Resin (B) particle diameter | Number average particle diameter (dn) | 1.94 | 1.86 | 1.48 | 1.52 | 1.47 | 1.66 | 1.44 |
|  | Volume average particle diameter (dv) | 2.92 | 2.86 | 2.17 | 2.44 | 2.41 | 2.65 | 2.35 |
|  | dv/dn | 1.51 | 1.54 | 1.47 | 1.61 | 1.64 | 1.59 | 1.63 |
| Mold contamination |  | X | X | X | X | X | X | ⊗ |
| Mold release properties |  | Δ | Δ | ○ | ○ | X | Δ | X |
| Appearance |  | Δ | Δ | ○ | ○ | Δ | ○ | X |
| Impact resistance | Before wet heat treatment(kJ/m$^2$) | 57 | 57 | 56 | 58 | 61 | 64 | 58 |
|  | After wet heat treatment(kJ/m$^2$) | 8 | 22 | 20 | 8 | 10 | 52 | 55 |
|  | Retention rate (%) | 14 | 39 | 36 | 14 | 16 | 81 | 95 |
| MFR | Before wet heat treatment(g/10 min) | 9.7 | 9.9 | 9.7 | 9.5 | 9.8 | 11.3 | 9.6 |
|  | After wet heat treatment(g/10 min) | 27.4 | 21.9 | 16.4 | 14.8 | 22.7 | 17.2 | 10.8 |
|  | Rate of increase (%) | 182 | 121 | 69 | 56 | 132 | 52 | 13 |

INDUSTRIAL APPLICABILITY

The polycarbonate resin composition of the present invention exhibits excellent mechanical properties and wet heat resistance while being free from the problem of mold contamination due to mold deposits, and can therefore be widely used in electrical and electronic devices, office automation equipment, information terminals, mechanical parts, domestic appliances, motor vehicle components, construction materials, containers and lighting devices, and according to the production method of the present invention, this type of polycarbonate resin composition can be produced with high productivity, and the present invention therefore exhibits high industrial applicability.

The invention claimed is:

1. A polycarbonate resin composition, comprising 60% to 95% by mass of a polycarbonate resin (A) and 40% to 5% by mass of an emulsion polymerized styrene-based resin (B), based on 100% by mass of the total of (A) and (B), wherein
the emulsion polymerized styrene-based resin (B) is a graft copolymer of a styrenic monomer-vinyl cyanide monomer and/or an alkyl (meth)acrylate monomer-rubbery polymer;
a total amount of gas in a case where the resin composition is heated at 280° C. for 10 minutes is 3000 ppm or less in terms of mass of decane,
styrene-based resin (B) is dispersed in the form of islands in a matrix of the polycarbonate resin (A),
a volume average particle diameter (dv) of the styrene-based resin (B) is 2.5 μm or less, and
a ratio (dv/dn) of the volume average particle diameter (dv) to a number average particle diameter (dn) of the styrene-based resin (B) is within a range 1.0 to 1.5.

2. The polycarbonate resin composition according to claim 1, wherein the volume average particle diameter (dv) of the styrene-based resin (B) is 2.2 μm or less and 0.5 μm or more, and the ratio (dv/dn) of the volume average particle diameter (dv) to a number average particle diameter (dn) of the styrene-based resin (B) is 1.15 to 1.4.

3. The polycarbonate resin composition according to claim 1, wherein an impact strength retention rate is 50% or more after being subjected to a wet heat treatment for 400 hours in an environment having a temperature of 90° C. and a relative humidity of 95%.

4. The polycarbonate resin composition according to claim 1, wherein the impact strength retention rate is 80% or more after being subjected to a wet heat treatment for 400 hours in an environment having a temperature of 90° C. and a relative humidity of 95%.

5. A molded article of the polycarbonate resin composition according to claim 1.

6. A method for producing a polycarbonate resin composition by melt kneading, in a vented twin screw extruder, a polycarbonate resin composition containing 60% to 95% by mass of a polycarbonate resin (A) and 40% to 5% by mass of an emulsion polymerized styrene-based resin (B), based on 100% by mass of the total of (A) and (B), the extruder having a first raw material supply port on an upstream side and one or more second raw material supply ports on a downstream side thereof, wherein when supply quantity of the emulsion polymerized styrene-based resin (B) is denoted by B(1), supply quantity of the polycarbonate resin (A) supplied from the first raw material supply port is denoted by A(1) and supply quantity of the polycarbonate resin (A) supplied from the second raw material supply port is denoted by A(2), a sum of A(1) and A(2) is a total supply quantity of the polycarbonate resin (A), the method comprising:

supplying the styrene-based resin (B) and the polycarbonate resin (A) from the first raw material supply port so as to satisfy the following formula:

$$B(1)>A(1) \text{ where, } A(1) \text{ includes } 0;$$

degassing gas components under reduced pressure from a vent port following the melt kneading; and then supplying the polycarbonate resin (A) in the quantity A(2) from the second raw material supply port, which is located further downstream than the vent port.

7. The method for producing a polycarbonate resin composition according to claim 6, wherein the gas components comprise gas components derived from an emulsifier.

8. A method for producing a polycarbonate resin composition by melt kneading, in a vented twin screw extruder, a polycarbonate resin composition containing 60% to 95% by mass of a polycarbonate resin (A) and 40% to 5% by mass of an emulsion polymerized styrene-based resin (B), based on 100% by mass of a total of (A) and (B), the extruder having a first raw material supply port on an upstream side, a water injection section and a vent port in a mixing section that is downstream of the first raw material supply port, and one or more second raw material supply ports downstream of the mixing section, wherein when supply quantity of the emulsion polymerized styrene-based resin (B) is denoted by B(1), supply quantity of the polycarbonate resin (A) supplied from the first raw material supply port is denoted by A(1) and supply quantity of the polycarbonate resin (A) supplied from the second raw material supply port is denoted by A(2), a sum of A(1) and A(2) is a total supply quantity of the polycarbonate resin (A), the method comprising:

supplying the styrene-based resin (B) and the polycarbonate resin (A) from the first raw material supply port so as to satisfy the following formula:

$$B(1)>A(1) \text{ where, } A(1) \text{ includes } 0;$$

injecting water from a water injection section in the mixing section, carrying out melt kneading, and then degassing gas components under reduced pressure from the vent port; and then supplying the polycarbonate resin (A) in the quantity A(2) from the second raw material supply port, which is located downstream of the vent port.

9. The method for producing a polycarbonate resin composition according to claim 8, wherein the gas components comprise gas components derived from an emulsifier.

10. The method for producing a polycarbonate resin composition according to claim 8, wherein the vented twin screw extruder is an extruder having a water injection section and a vent port in multiple stages and water injection and degassing under reduced pressure are carried out in multiple stages.

11. A molded article obtained by molding a polycarbonate resin composition produced by the method of claim 6.

12. A molded article of the polycarbonate resin composition according to claim 2.

* * * * *